United States Patent Office 2,789,975
Patented Apr. 23, 1957

2,789,975
AZO DYESTUFFS OF THE PYRAZOLONE SERIES

Hans Ruckstuhl, Basel, Switzerland, assignor, by mesne assignments, to Saul & Co., Newark, N. J., as nominee of Fidelity Union Trust Company No Drawing. Application May 17, 1954,
Serial No. 430,460

Claims priority, application Switzerland May 22, 1953

6 Claims. (Cl. 260—147)

Chromium and cobalt complex compounds of monoazo dyestuffs are known, which do not contain sulfonic acid groups and which are made from diazotized 2-amino-1-hydroxy-benzenes containing a nuclearly bound alkylsulfonyl or sulfonic acid amide group, and from 1-phenyl-5-pyrazolones. These compounds dye wool and nylon, for example, generally from a neutral bath, in yellow, orange to brown shades of excellent fastness properties.

A primary object of the present invention is the embodiment of dyestuffs of the aforesaid type which yield red shades.

This object is realized according to the present invention by the expedient of introducing a cyanogen group into the phenyl nucleus of the 1-phenyl-5-pyrazolones whereby, surprisingly, the shade of the dyeings obtained with the metal complex compounds of the thus-modified monoazo dyestuffs is greatly shifted toward the red. The invention thus makes it possible, for the first time, to produce interesting and valuable red dyeings with dyestuffs of the indicated type.

The dyestuffs according to the present invention can be prepared by coupling one mol of the diazo compound of an aminobenzene—which contains in meta or para position to the amino group an alkylsulfonyl group or a sulfonic acid amide group which may be substituted at the nitrogen atom, which has an hydroxy or methoxy group in ortho-position to the amino group, and which may contain a further substituent—with one mol of a 1-phenyl-3-methyl-5-pyrazolone or of a 1-phenyl-5-pyrazolone-3-carboxylic acid amide which may be substituted, for example by alkyl, at the nitrogen atom of the carboxylic acid amide group, the phenyl nucleus of said last-mentioned compounds containing a cyanogen group preferably in 3'- or 4'-position in addition, if desired, to a further substituent. The so-obtained monoazo dyestuff is then treated, in substance or on the fiber, with a metal-yielding agent—preferably a chromium- or cobalt-yielding agent, the metallization in substance being carried out in such manner that in the metal complex compounds there are less than two atoms of metal for two molecules of monoazo dyestuff.

The azo dyestuffs according to the invention thus correspond, in the metal-free state, to the formula

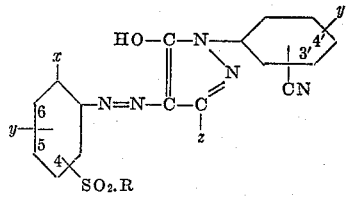

wherein $x$ stands for hydroxy or methoxy, $y$ stands for hydrogen, halogen, alkyl or nitro, $z$ stands for methyl, —$CO.NH_2$ or —$CO.NH.alkyl$, and R stands for alkyl, —$NH_2$, —$NH.alkyl$, —$NH.alkoxyalkyl$, —$NH.cycloalkyl$, —$NH.aralkyl$, —$NH$-aryl or

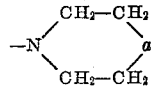

wherein $a$ is a simple bond or an —O— bridge, alkyl is lower alkyl, aryl may be further substituted, —$SO_2.R$ is in the 4-, or 6-position, and —CN is in the 3'- or 4'-position.

The metal-free dyestuffs dyed by the afterchroming process or by the so-called metachrome process and the metal complex compounds of this invention dye wool and synthetic polyamide fibers in shades which are shifted toward the red compared with those shades obtained by similar dyestuffs without the cyanogen group, and which show a very good fastness to fulling, washing and light.

A series of the metal-free monoazo dyestuffs, represented primarily by those having a 3-positioned carboxylic acid amide group in the pyrazolone moiety, dye wool and synthetic polyamide fibers, such as nylon, Perlon and the like, by the afterchroming process in level, full orange and red shades of excellent fastness to fulling, potting, washing, carbonizing and light. They are also excellently suited for dyeing according to the single-bath chroming process, the so-called metachrome process; this valuable property endows this group of dyestuffs with great technical importance.

The metal complex compounds, wherein less than two atoms of metal are present per two molecules of monoazo dyestuffs, have an outstanding neutral drawing capacity (affinity) for wool; they dye this fiber, usually from a neutral bath, in level, full yellow-brown, orange to red shades of very good fastness to fulling and washing and an excellent fastness to light; they are also suitable for the dyeing of silk and leather and especially for dyeing nitrogen-containing synthetic fibers, such as synthetic polyamide fibers (e. g. nylon, Perlon, etc.).

The coupling of the diazo compounds of the aminobenzenes with the pyrazolones to produce monoazo dyestuffs is preferably carried out in alkaline medium. Illustrative of substituents —$SO_2.R$ in the foregoing formula are the methylsulfonyl, ethylsulfonyl, propylsulfonyl and butylsulfonyl groups, the sulfonic acid amide group, and also sulfonic acid amide groups which are N-substituted for example by methyl, ethyl, propyl, butyl, cyclohexyl, benzyl, 2-phenylethyl, morpholyl, pyrrolidyl, phenyl, etc. The phenyl may be itself substituted, for example by halogen, lower alkyl, carboxyl and/or sulfonic acid amide which may be substituted at the nitrogen atom. Valuable representatives of the new dyestuffs also comprise those which contain a sulfonic acid alkylamide group which is substituted at the alkyl group by a lower alkoxy group, as for example —$SO_2.NH.CH_2CH_2OCH_3$ and

—$SO_2.NH.CH_2.CH_2.CH_2.OCH_3$ etc. The $y$ variants, in addition to hydrogen and nitro, comprise e. g. fluorine, chlorine and bromine atoms and the methyl and ethyl groups.

The conversion of the monoazo dyestuffs into the metal-containing—preferably chromium- or cobalt-containing—azo dyestuffs is carried out for example with salts of chromium (III), such as chromium fluoride, chromium sulfate, chromium formate, chromium acetate, potassium chromium sulfate and ammonium chromium sulfate, and with salts of cobalt (II), such for instance as cobalt acetate, cobalt formate and cobalt sulfate, in aqueous suspension or solution or in organic medium, for example in formamide or in a melt of an alkali salt of a low molecular aliphatic carboxylic acid. In the latter case, use may also be made of insoluble heavy metal compounds, such for example as cobalt hydroxide and cobalt carbonate. It is particularly advantageous to carry out the metallization in aqueous caustic alkline medium, the metal salts being added if necessary in the presence of compounds, such as tartaric acid, citric acid, lactic acid, etc., which keep chromium and cobalt in complex combination in solution in caustic alkaline medium. The chromates, such for example as sodium chromate, potassium chromate, sodium bichromate, potassium bichromate, etc., are also excellently suited for the preparation of the chromium complex compounds. Chroming of the monoazo dyestuffs with chromates is also carried out in strong caustic alkaline medium, in the presence if necessary of reducing agents. Where $x$, in the foregoing formula, stands for methoxy, the metallization—with splitting of the methoxy group—is preferably carried out in organic solvents, such for example as glycols (ethylene glycol, ethylpolyglycol, butylpolyglyco, etc.) and in the presence of an acid-binding agent such for instance as sodium acetate. The resultant metal-containing azo dyestuffs are precipitated from aqueous medium—if necessary after pouring the organic metallization solution into water—by the addition of sodium chloride, after which the precipitate is filtered off, washed if necessary, and dried.

The following examples illustrate the invention, but are not limitative thereof. In the examples, the parts and percentages are by weight, and the temperatures are in degrees centigrade.

EXAMPLE 1

30.8 parts of 2-amino-1-hydroxybenzene-4-sulfonic acid-(2'-carboxy)-phenylamide are dissolved in 200 parts of water with the aid of 15 parts of aqueous sodium hydroxide solution of 30% strength. After the addition of 6.9 parts of sodium nitrite, the solution is allowed to run at 5° into a mixture of 30 parts of hydrochloric acid of 30% strength and 50 parts of water and ice. The resultant diazo compound is combined with a solution of 20 parts of 1-(4'-cyano)-phenyl-3-methyl-5-pyrazolone, 25 parts of sodium carbonate, 15 parts of aqueous sodium hydroxide solution of 30% strength and 200 parts of water. Upon completion of the ensuing coupling, the obtained monoazo compound is isolated and dried. The ground dyestuff is a red powder which dissolves with reddish yellow coloration in concentrated sulfuric acid and in dilute aqueous sodium hydroxide solution. It corresponds to the formula

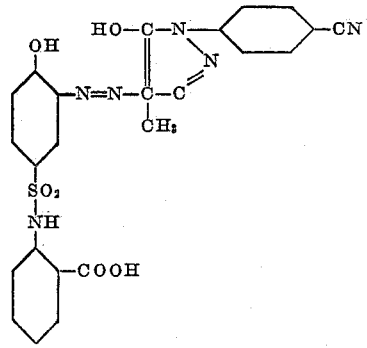

and dyes wool, afterchromed and by the single-bath chroming process, in full reddish orange shades which are excellently fast to fulling, potting, carbonizing and light.

Table I, which follows, sets forth additional dyestuffs according to the present invention which may be prepared by following the prescriptions of Example 1, while replacing the diazo component of the example by the diazo components set forth in column A and the azo component of the example by the respectve azo components set forth in column B. The resulting monoazo dyestuffs, which are suitable for dyeing by the afterchroming process as well as by the single-bath chroming process, are characterized in column C of the table by the shade of the respective chromed dyeings on wool.

Table I

| Example No. | A | B | C |
|---|---|---|---|
| 2 | 2-amino-1-hydroxy-benzene-4-sulfonic acid-(2'-carboxy)-phenylamide. | 1-(3'-cyano)-phenyl-3-methyl-5-pyrazolone. | red-orange. |
| 3 | do | 1-(3'-cyano-4'-chloro)-phenyl-3-methyl-5-pyrazolone. | Do. |
| 4 | 2-amino-1-hydroxy-benzene-4-sulfonic acid-(3'-carboxy)-phenylamide. | do | Do. |
| 5 | 2-amino-1-hydroxy-benzene-4-sulfonic acid-(3'-sulfamido)-phenylamide. | do | Do. |
| 6 | 2-amino-1-hydroxy-benzene-4-sulfonic acid-butylamide. | 1-(4'-cyano)-phenyl-3-methyl-5-pyrazolone. | Do. |
| 7 | 2-amino-1-hydroxy-benzene-4-sulfonic acid-cyclohexyl-amide. | do | Do. |
| 8 | 2-amino-1-hydroxy-benzene-4-sulfonic acid-benzylamide. | do | Do. |
| 9 | 2-amino-1-hydroxy-benzene-4-sulfonic acid-phenylamide. | 1-(3'-cyano)-phenyl-5-pyrazolone-3-carboxylic acid amide. | red. |
| 10 | do | 1-(4'-cyano)-phenyl-5-pyrazolone-3-carboxylic acid ethylamide. | Do. |
| 11 | 2-amino-1-hydroxy-benzene-4-sulfonic acid-(2'-chloro)-phenylamide. | 1-(4'-cyano)-phenyl-5-pyrazolone-3-carboxylic acid amide. | Do. |
| 12 | 2-amino-1-hydroxy-benzene-4-sulfonic acid-(4'-methyl)-phenylamide. | 1-(3'-cyano)-phenyl-5-pyrazolone-3-carboxylic acid-methylamide. | Do. |

The formula of a representative dyestuff of the foregoing table is that of Example 9:

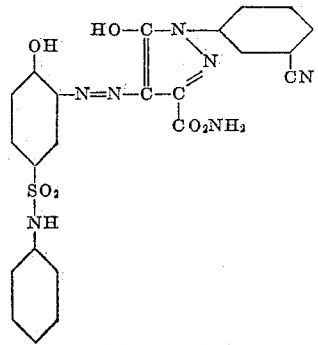

EXAMPLE 13

20.2 parts of 2-amino-1-hydroxybenzene-4-sulfonic acid methylamide are dissolved in 100 parts of water and 15 parts of hydrochloric acid of 30% strength. The solution is cooled to 5° by means of ice and is then directly diazotized with the aid of an aqueous solution of 6.9 parts of sodium nitrite. The resultant diazo suspension is poured at 10° into a solution of 20 parts of 1-(4'-cyano)-phenyl-3-methyl-5-pyrazolone, 25 parts of sodium carbonate, 15 parts of an aqueous sodium hydroxide solution of 30% strength and 200 parts of water. Upon completion of the ensuing coupling, the precipitated monoazo compound is filtered off.

The thus-obtained dyestuff paste is stirred into 500 parts of water; 35 parts of aqueous sodium hydroxide solution of 30% strength are added to the suspension which is then heated to 60°. At the latter temperature and in the course of about 10 minutes, a solution of 16 parts of crystalline cobalt (II) sulfate in 80 parts of water is then added dropwise to the said suspension. The reaction mass is maintained at 60° for another 20 minutes, and is then stirred for several more hours at room temperature, after which the produced cobalt complex compound is isolated by salting out and filtering off. The dried cobalt-containing azo dyestuff corresponds to the formula

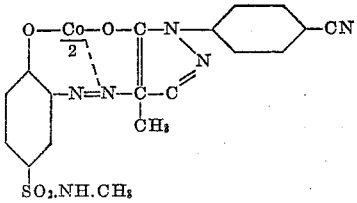

and is a red-brown powder which dissolves with yellow coloration in concentrated sulfuric acid and with orange coloration in water, and dyes wool, silk and synthetic polyamide fibers (nylon, Perlon, etc.) from a neutral to weakly (acetic) acid bath in brown-yellow shades which are fast to fulling, washing and light.

EXAMPLE 14

21.6 parts of 2-amino-1-methoxybenzene-4-sulfonic acid methylamide are directly diazotized after the manner described in Example 13 and then coupled with 20 parts of 1-(4'-cyano)-phenyl-3-methyl-5-pyrazolone. The resultant dyestuff is filtered off and dried. To convert it into the chromium complex compound, the ground dyestuff is heated to 135–140° for 6–8 hours in 400 parts of ethylpolyglycol together with 40 parts of potassium chromium (III) sulfate and 30 parts of sodium acetate. The reactive mixture is then allowed to cool, after which it is poured into 1200 parts of water. The resultant metal complex compound is filtered off and the obtained paste is stirred into 500 parts of water and 30 parts of aqueous sodium hydroxide solution of 30% strength. After a short time, sodium chloride is added to the suspension. The precipitated chromium-containing azo dyestuff is then filtered off and dried. It corresponds to the formula

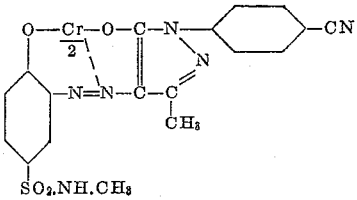

and is a brown-red powder which dissolves with yellow coloration in concentrated sulfuric acid and with orange-red coloration in water, and dyes wool, silk and synthetic polyamide fibers from a neutral to weakly (acetic) acid bath in full orange-red shades of excellent fastness to fulling, washing and light.

EXAMPLE 15

20.2 parts of 2-amino-1-hydroxybenzene-4-sulfonic acid methylamide are directly diazotized after the manner described in Example 13, and then coupled with 24 parts of 1-(3'-cyano-4'-chloro)-phenyl-3-methyl-5-pyrazolone. The precipitated monoazo dyestuff is filtered off and dried, and then heated to 95° for 8 hours in 300 parts of formamide together with a mixture of 25 parts of sodium acetate and 40 parts of ammonium chromium (III) sulfate. The reaction mixture is allowed to cool to 20 to 25°, then poured into 700 parts of water and, after the addition of 50 parts of sodium chloride, the precipitated chromium complex compound is filtered off. The filter cake is introduced at room temperature (about 20–30°) into a solution of 45 parts of aqueous sodium hydroxide solution of 30% strength and 600 parts of water. After stirring for several hours, 80 parts of sodium chloride are added to the reaction mass, whereupon the chromium-containing dyestuff which precipitates is filtered off. It corresponds to the formula

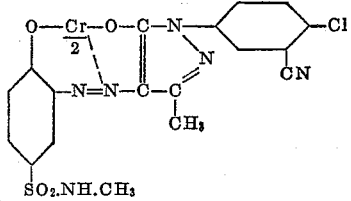

and, dried, is a brown-red powder which dissolves with yellow coloration in concentrated sulfuric acid and with orange-red coloration in water, and dyes wool, silk and synthetic polyamide fibers from a neutral to weakly (acetic) acid bath in full orange-red shades of excellent fastness to fulling, washing and light.

To convert the monoazo dyestuff into the cobalt complex compound, the procedure outline in Example 13 is followed. The obtained product, dried, is a red-brown powder which dissolves with yellow coloration in concentrated sulfuric acid and with orange coloration in water, and dyes wool, silk and synthetic polyamide fibers from a neutral to weakly acid bath in full brown-yellow shades of excellent fastness to fulling, washing and light.

EXAMPLE 16

20.2 parts of 2-amino-1-hydroxybenzene-5-sulfonic acid methylamide are directly diazotized after the manner described in Example 13, and then coupled with 20 parts of 1-(3'-cyano)-phenyl-3-methyl-5-pyrazolene. The resultant precipitated monoazo dyestuff is filtered off, dried, and converted into the chromium complex compound after the manner described in Example 15. The chromium-containing azo dyestuff corresponds to the formula

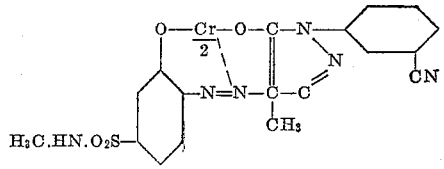

and is a brown-red powder which dissolves with reddish yellow coloration in concentrated sulfuric acid and with red coloration in water, and dyes wool, silk and synthetic polyamide fibers from a neutral to weakly acid bath in full yellowish red shades of excellent fastness to fulling, washing and light.

EXAMPLE 17

A similar, chromium-containing azo dyestuff, which dyes a somewhat more bluish red than the dyestuff according to the preceding example, is obtained when, in such example, the 20 parts of 1-(3'-cyano)-phenyl-3-methyl-5-pyrazolene are replaced by the same quantity of 1-(4'-cyano)-phenyl-3-methyl-5-pyrazolene and otherwise proceeding as set forth in the said example. The chromium-containing azo dyestuff thus obtained corresponds to the formula

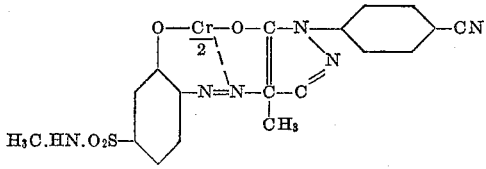

In the following Table II, additional dyestuffs are set forth which can be prepared after the manner described in Examples 13, 14, 15 or 16. The dyestuffs are characterized by the respective diazo components (column D of the table) and the respective azo components (column E of the table) of the metal-free monoazo dyestuffs and by the shades of the dyeings on wool of the corresponding metal complex compounds; column F of the table sets forth the shades of the dyeings with the chromium complex compounds and column G sets forth the shades of the dyeings with the cobalt complex compounds.

Table II

| Example No. | D | E | F | G |
|---|---|---|---|---|
| 18 | 2-amino-1-hydroxy-4-methyl-sulfonyl-benzene. | 1-(4'-cyano)-phenyl-3-methyl-5-pyrazolone. | orange-red | brown-yellow. |
| 19 | ----do---- | 1-(3'-cyano-4'-chloro)-phenyl-3-methyl-5-pyrazolone. | ----do---- | Do. |
| 20 | 2-amino-1-hydroxybenzene-4-sulfonic acid-amide. | ----do---- | ----do---- | Do. |
| 21 | 2-amino-1-hydroxybenzene-4-sulfonic acid-pyrrolidyl-amide. | 1-(4'-cyano)-phenyl-3-methyl-5-pyrazolone. | ----do---- | Do. |
| 22 | 2-amino-1-hydroxybenzene-5-sulfonic acid-methylamide. | 1-(3'-cyano-4'-chloro)-phenyl-3-methyl-5-pyrazolone. | red | yellowish brown. |
| 23 | 2-amino-1-hydroxy-4-chloro-benzene-5-sulfonic acid-amide. | 1-(3'-cyano)-phenyl-3-methyl-5-pyrazolone. | ----do---- | Do. |
| 24 | ----do---- | 1-(4'-cyano)-phenyl-3-methyl-5-pyrazolone. | ----do---- | Do. |
| 25 | 2-amino-1-hydroxy-4-chloro-benzene-6-sulfonic acid-methylamide. | 1-(3'-cyano)-phenyl-3-methyl-5-pyrazolone. | ----do---- | Do. |
| 26 | 2-amino-1-hydroxybenzene-4-sulfonic acid-(3'-methoxy)-propylamide. | ----do---- | orange-red | brown-yellow. |
| 27 | 2-amino-1-hydroxy-4-methyl-sulfonyl-5-nitrobenzene. | ----do---- | red | yellowish brown. |
| 28 | ----do---- | 1-(4'-cyano)-phenyl-3-methyl-5-pyrazolone. | ----do---- | Do. |
| 29 | 2-amino-1-methoxy-4-methyl-sulfonylbenzene. | ----do---- | orange-red | brown-yellow. |
| 30 | 2-amino-1-methoxybenzene-4-sulfonic acid-morpholyla-mide. | 1-(3'-cyano)-phenyl-3-methyl-5-pyrazolone. | ----do---- | Do. |
| 31 | 2-amino-1-hydroxy-4-chloro-benzene-6-sulfonic acid-amide. | 1-(4'-cyano)-phenyl-3-methyl-5-pyrazolone. | red | yellowish brown. |
| 32 | ----do---- | 1-(3'-cyano)-phenyl-3-methyl-5-pyrazolone. | ----do---- | Do. |
| 33 | 2-amino-1-hydroxybenzene-5-sulfonic acid-ethylamide. | ----do---- | ----do---- | Do. |
| 34 | 2-amino-1-hydroxybenzene-5-sulfonic acid-propylamide. | ----do---- | ----do---- | Do. |
| 35 | 2-amino-1-hydroxybenzene-5-sulfonic acid-(2'-methoxy)-ethylamide. | ----do---- | ----do---- | Do. |
| 36 | 2-amino-1-hydroxy-4-methyl-benzene-5-sulfonic acid-amide. | ----do---- | ----do---- | Do. |

Representative examples are Examples 23 and 24. The formulae of the corresponding chromium-containing azo dyestuffs are

EXAMPLE 23

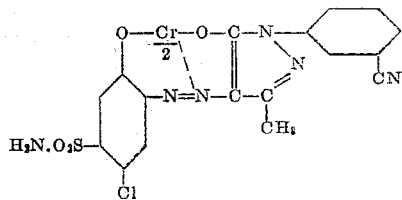

and

EXAMPLE 24

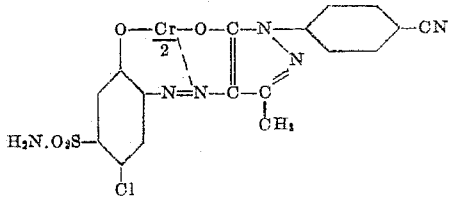

EXAMPLE 37

0.5 part of the monoazo dyestuff obtainable according to Example 1 is dissolved in 2000 parts of water, 5 parts of sodium sulfate and 1 part of acetic acid are added to the solution, and 50 parts of wool are entered into the thus-prepared bath at 40°. Then, while frequently moving the material to be dyed, the temperaturea of the bath is brought to boiling temperature in the course of 30 minutes. After a boiling period of 30 minutes, the evaporated water is replaced, and 1 part of formic acid is added to the bath. The 30-minute boiling period is then repeated, evaporated water again replaced, 0.5 part of sodium bichromate added to the bath, the latter being then maintained at a temperature of 95–100° while repeatedly moving the wool around. The dyed material is then withdrawn, thoroughly rinsed in cold water, and dried. It is dyed in a reddish orange shade.

EXAMPLE 38

One part of anhydrous sodium sulfate and 0.2 part of the chromium-containing azo dyestuff obtainable according to Example 16 are dissolved in 500 parts of water. 10 parts of pre-wetted wool are entered into the thus-prepared bath at 30°, after which the bath is heated to 100° in the course of 15 minutes. The temperature of the bath is maintained at 100° for 60 minutes, 0.2 part of concentrated acetic acid being added to the bath a little at a time in the course of the dyeing process. Upon completion of the latter, the wool—which is dyed a yellowish red—is rinsed with water and is dried.

Synthetic polyamide fibers are dyed in like manner, as is also silk, except that in the case of the latter, a somewhat lower temperature, e. g., a temperature of 95°, is employed.

Having thus disclosed the invention, what is claimed is:

1. An azo dyestuff of the pyrazolone series selected from the class consisting of the monoazo dyestuffs corresponding to the formula

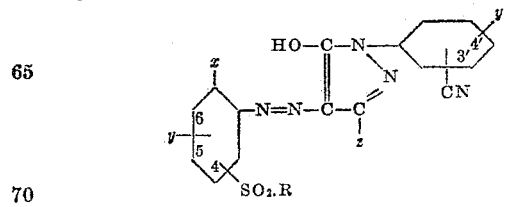

and the chromium complex compounds and cobalt complex compounds thereof, said complex compounds containing less than two atoms of metal per two molecules of azo dyestuff, where, in the said formula, x stands for a member selected from the group consisting of hydroxy and methoxy, each y stands for a member selected from the group consisting of hydrogen, halogen, lower alkyl and nitro, z stands for a member selected from the group consisting of methyl, —CO.NH₂ and —CO.NH.lower alkyl, and R stands for a member selected from the group consisting of lower alkyl, —NH₂, —NH.lower alkyl, —NH.lower alkoxyalkyl, —NH.cycloalkyl, —NH.aralkyl, —NH.aryl,

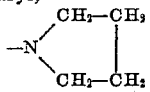 and 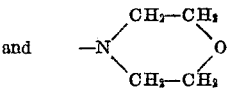

the —SO₂.R radical being in one of the positions 4, 5 and 6, and the cyano group being in one of the positions 3' and 4'.

2. The azo dyestuff of the pyrazolone series, corresponding to the formula

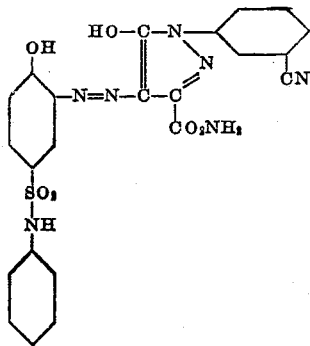

3. The azo dyestuff of the pyrazolone series, corresponding to the formula

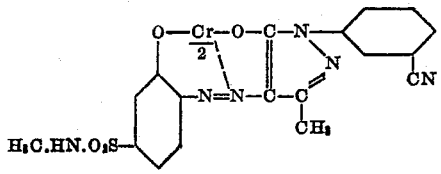

4. The azo dyestuff of the pyrazolone series, corresponding to the formula

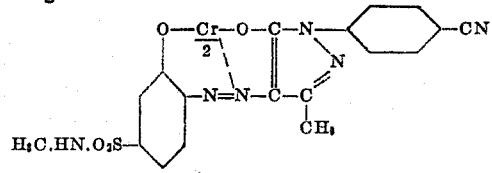

5. The azo dyestuff of the pyrazolone series, corresponding to the formula

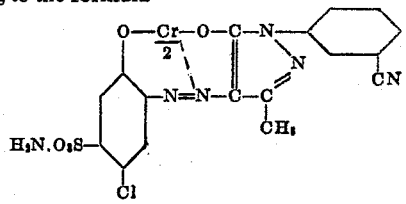

6. The azo dyestuff of the pyrazolone series, corresponding to the formula

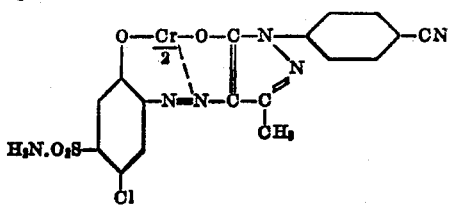

References Cited in the file of this patent
UNITED STATES PATENTS

| | | |
|---|---|---|
| 2,109,024 | Holzach et al. | Feb. 22, 1938 |
| 2,228,288 | Suckfull | Jan. 14, 1941 |
| 2,439,798 | Dickey et al. | Apr. 20, 1948 |
| 2,457,823 | Kendall et al. | Jan. 4, 1949 |
| 2,512,251 | Kleene | June 20, 1950 |
| 2,565,898 | Widmer et al. | Aug. 28, 1951 |
| 2,673,199 | Widmer et al. | Mar. 23, 1954 |